Dec. 16, 1924.
J. ROLLI
VEHICLE PULL
Filed June 22, 1921
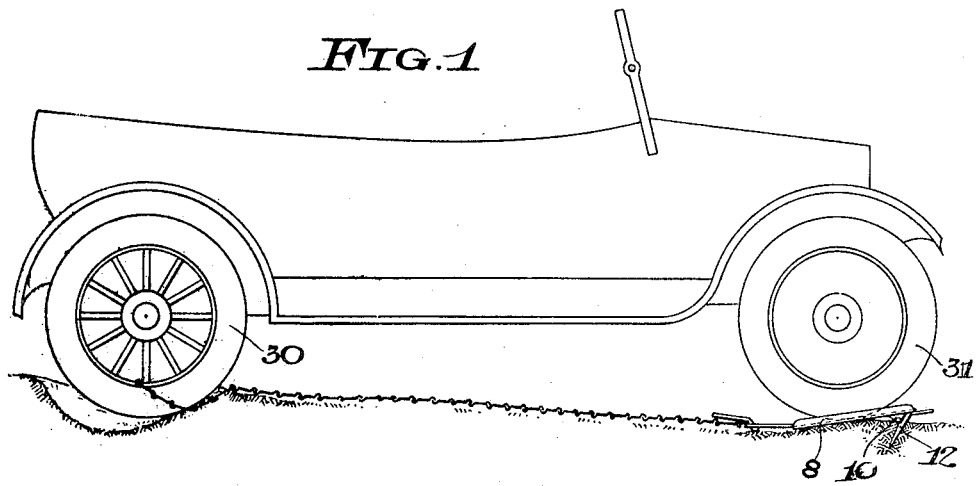
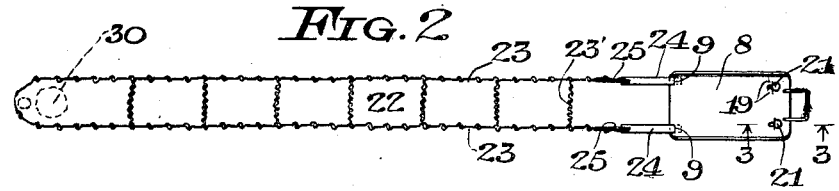
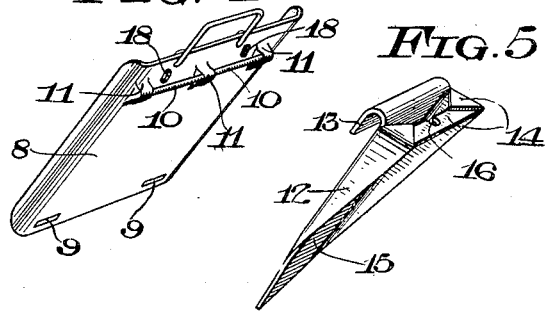
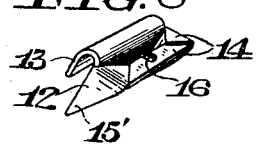
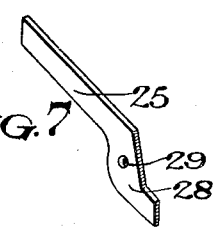
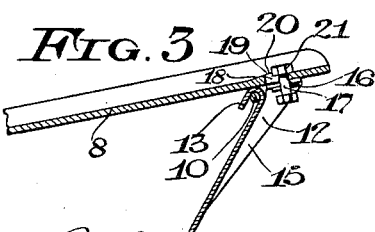
WITNESSES
INVENTOR
John Rolli
ATTORNEY Patented Dec. 16, 1924.

1,519,334

UNITED STATES PATENT OFFICE.

JOHN ROLLI, OF WEST ALLIS, WISCONSIN.

VEHICLE PULL.

Application filed June 22, 1921. Serial No. 479,695.

*To all whom it may concern:*

Be it known that I, JOHN ROLLI, a citizen of the United States, and resident of West Allis, in the county of Milwaukee and State of Wisconsin, have invented new and useful Improvements in Vehicle Pulls, of which the following is a description, reference being had to the accompanying drawings, which are a part of this specification.

The invention relates to a pull out device for motor driven vehicles.

The object of the invention is to provide a pull out device for extricating a vehicle from mud holes or depressions in the roadway without the necessity of establishing or using an anchor post.

The invention further consists in the several features hereinafter set forth and more particularly defined by claims at the conclusion hereof.

In the drawings: Fig. 1 is an elevation view of a device embodying the invention, showing it in operation; Fig. 2 is a plan view of the device; Fig. 3 is a detail sectional view taken on the line 3—3 of Fig. 2; Fig. 4 is a perspective view of the pan; Fig. 5 is a perspective view of a hook for use with the pan; Fig. 6 is a perspective view of one of the chain connectors; Fig. 7 is a perspective view of another of the chain connectors; Fig. 8 is a perspective view of another form of hook.

The device embodies a pan 8 having slots 9 near its rear edge and a hook-engaging portion 10, here shown in the form of a rod or rods welded or otherwise suitably secured to ears 11 on the bottom of the pan.

Road-engaging members 12 have hooked portions 13 engageable with the rods 10, and have tops 14 engageable with the bottom of the pan 8. These members may be formed with long pointed ends 15, as shown in Fig. 5, for use in muddy places, or they may be short with flat ends 15', as shown in Fig. 8, for use on concrete or other roads having a finished surface. Either form of member 12 is interchangeable with the other. The top 14 of each member may be provided with a recess 16 spaced from the hook to receive a bolt 17 passed through a longitudinal slot 18 in the plate to prevent accidental disengagement of the member 12 from the plate. Short inclined projections 19 are formed in the pan at the sides of the slot 18 to form shoulders 20 behind which the head 21 of the bolt drops when its shank is positioned within the recess 16. The bolts 17 also serve to prevent any tendency of the members 14 to tilt laterally with respect to the pan.

Means are provided for connecting the pan to one of the traction wheels of the vehicle, comprising a composite chain 22, preferably of the non-skid wheel type of chain, having longitudinally extending chains 23 and cross chains 23', which is adapted to be attached to the traction wheel in any suitable manner, as by fastening the ends of the longitudinal chains 23 about the felloe and a spoke of the wheel and this chain is secured at its other end to the rear of the pan in any suitable manner. I prefer for this purpose to use a pair of connectors 24 and 25 for each of the chains 23 so that the chain may be automatically unfastened from the pan. Each connector 24 consists of a bar having a hook 26 at one end engageable in the slot 9 and a slot 27 in the other end. Each connector 25 has a hook 28 engageable in the slot 27 and a hole 29 near said hook to receive an end of one of the chains.

The device is shown in operation in Fig. 1, where the rear wheel 30, connected by the chain 22 to the anchor formed by the pan 8 and road-engaging members 12, is in the act of winding up said chain upon it, which action moves the whole vehicle forwardly, the front wheel 31 riding up on the pan 8, the weight of the vehicle acting on the pan and forcing the members 12 into the roadbed. When the chain is fully wound up on the rear wheel the connectors 25 are automatically tilted and released from engagement with the connectors 24. The device is set for use by placing the pan 12 just in front of the wheel 31 and securing the connectors 24 to it on each side of this wheel, then coupling up the chain 22 with the pan 8 by hooking up the connectors 25 with the connectors 24 and then running the chain back and connecting it to the rear wheel 30 so that the chain will be wound up on said wheel as the vehicle is started forwardly. The device may also be used to back the rear wheel out of a depression in the road by placing the pan behind said wheel and backing up on to the pan. The chain with its anchor provides positive traction on the wheel to be extricated.

If both rear wheels are mired or caught in depressions in the roadway then a pull of the character above described is used for each traction wheel.

The chain 22 and the members 12 are readily removable from the pan 8 through the connections previously described, so that the device may be readily carried and handled in knockdown condition.

It will be understood that the members 12 may be formed integral with the pan and that other modifications may be made. I therefore desire it to be understood that the invention is not to be limited to any particular form or arrangement of parts except in so far as such limitations are specified in the claims.

What I claim as my invention is:

1. In a vehicle pull, the combination of a wheel-receiving pan having a hook-receiving portion on the underside thereof near its front edge, a road-engaging member having a hooked portion engageable with said hook-receiving portion and a flat top engageable with the underside of the pan, and a flexible connection between said pan and the wheel to be extricated.

2. In a vehicle pull, the combination of a wheel-receiving pan having a hook-engaging portion on the underside thereof, a road-engaging member having a hook engageable with said portion and a flat top provided with a recess spaced from said hook, and a bolt carried by the pan and having its shank engageable in said recess.

3. In a vehicle pull, the combination of a wheel-receiving pan, a road-engaging member, a detachable hook connection between said member and the underside of the pan, said member having a top abutting against the under side of the pan, and fastening means securing the top of said member to the pan.

In testimony whereof, I affix my signature.

JOHN ROLLI.